May 19, 1942.  R. L. WITHAM  2,283,525
SALINITY INDICATOR AND ALARM
Filed Jan. 20, 1939
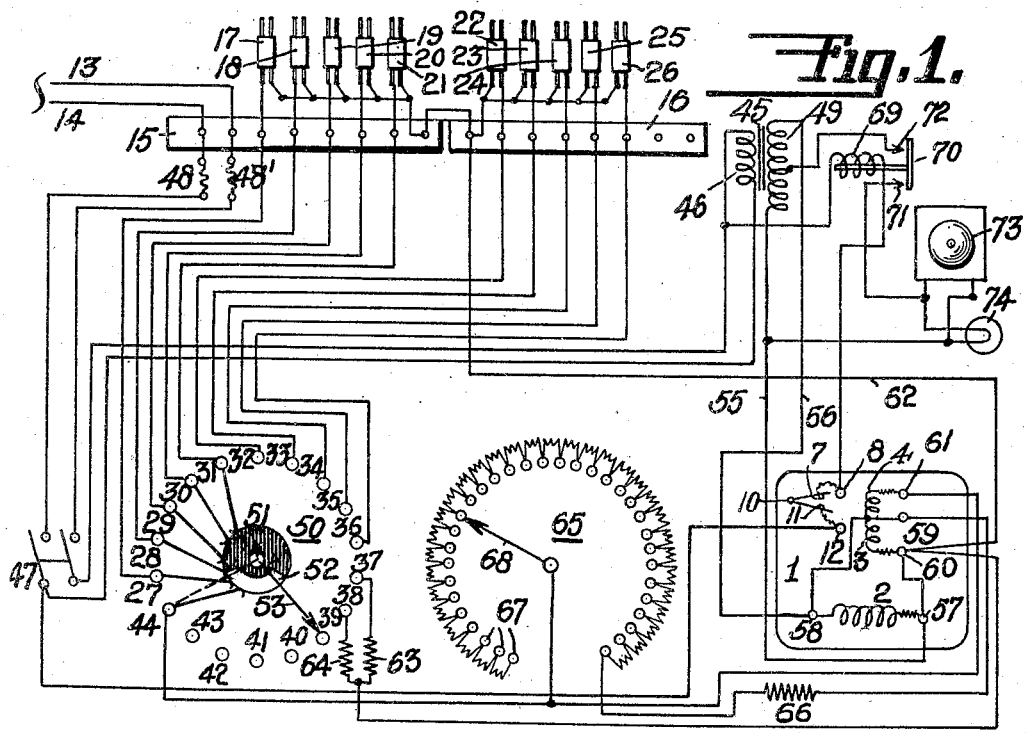
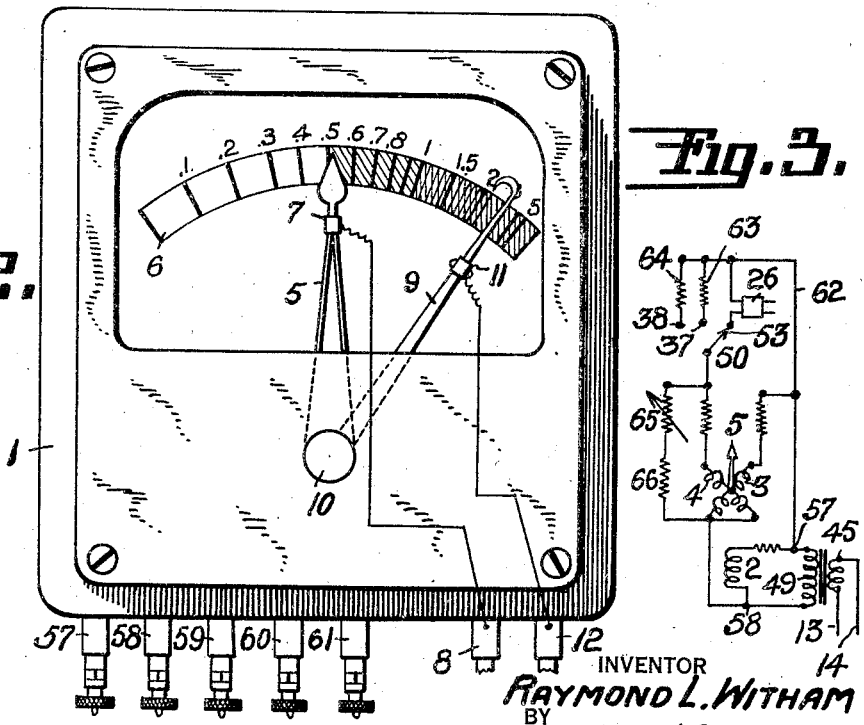
INVENTOR
RAYMOND L. WITHAM
BY
Herbert H. Thompson
HIS ATTORNEY Patented May 19, 1942

2,283,525

UNITED STATES PATENT OFFICE 2,283,525

SALINITY INDICATOR AND ALARM

Raymond L. Witham, Mountain Lakes, N. J., assignor to Sperry Gyroscope Company, Inc., Brooklyn, N. Y., a corporation of New York Application January 20, 1939, Serial No. 251,901

1 Claim. (Cl. 177—311)

This invention relates to means for detecting and indicating harmful impurities in boiler water, and especially for detecting such impurities which increase the formation of scale on the boiler walls. In general, most of these impurities are caused by the minerals soluble in water and commonly referred to as the salinity content in sea water.

It is well known that the boiler water used for the generation of steam in ships is kept as pure as possible and is used over and over again by condensing the steam after its energy has been used. This condensation process is accomplished by means of so-called condensers which are continuously cooled by sea water pumped into an intricate system of pipes and radiator-like structures. If a leak in any of these condensers develops, salt water seeps into the fresh water and contaminates the feed water, thereby making it unfit for boiler use.

Instruments called "salinity indicators" have been devised to continuously measure and indicate the amount of salt which is dissolved in a given quantity of boiler feed water, so that dangerous leaks of sea water into the fresh water can be detected and remedied before damage has been done. An instrument of this type is fully described and set forth in my copending application, now Patent No. 2,150,015, dated March 7, 1939, for Salinity indicator system.

It has, however, become necessary to provide means by which a single salinity indicator can serve simultaneously a plurality of salinity cells or testers located at different points, and by which an alarm can be sounded automatically if the water become contaminated. The present invention therefore provides a novel combination switch by which any number of salinity cells from one to five, or more, may be connected singly or together into the salinity indicator circuit and by which this circuit is supervised by an automatic alarm device ringing a bell and operating a warning light as soon as a given amount of salinity is reached anywhere in the circuit. Naturally, if the salinity indicator is set to give an alarm at, say, one grain per gallon maximum for a combination of five cells, then this maximum would be obtained if all five of the cells each had a salinity of .2 grain. However, practice has shown that usually one cell encounters excessive salinity before any of the others, so that by testing successively the five cells in the group, the abnormally saline cell can easily be determined.

The novel switch and circuit employed also provides means for checking the correctness of a salinity indicator by providing calibrated resistors which can be put into the circuit instead of a cell immersed in water of a given temperature with a salinity of, say, one grain per gallon. The pointer of the meter then should go to the numeral 1 on the scale of the instrument, and if this is not the case, it is an indication that recalibration of the circuit is necessary.

In my invention I also make use of a second checking resistor representing a cell with an abnormally high salinity content so that by inserting this resistor in the circuit, the pointer will move completely across the scale so that the alarm circuit may be checked at any time regardless of the position of the warning contact provided for in the indicator.

In the accompanying drawing,

Fig. 1 shows the wiring diagram of my salinity indicator and novel selector switch.

Fig. 2 shows the face of the measuring instrument employed in the circuit.

Fig. 3 shows a simplified schematic wiring diagram to illustrate the general principle of measurement.

The measuring instrument employed is of the crossed coil type with a stationary field coil, as more completely described and claimed in my aforesaid prior patent, and is operated by alternating current from a supply 13, 14. It therefore suffices to mention that in the instrument 1 there is a field coil 2 which is continuously excited from the line, and two mechanically connected cross coils 3 and 4, of which 3 is the so-called holding coil and 4 the deflecting coil. Calibrating resistors are used in series with each of these coils inside of the instrument case in order to obtain correct phase vector relations.

The instrument 1, as shown in more detail in Fig. 2, has a pointer 5 which is moved by the crossed coils 3 and 4 and which, by its position, indicates the amount of salinity in grains per gallon on a scale 6, or on any other desired scale. The pointer 5 also carries an insulated electrical contact 7 which is internally connected to a terminal 8. There also is provided an arm 9 adjustable from without the instrument by means of knob 10, and carrying an insulated contact 11 which, in turn, is electrically connected to terminal 12. If pointer 5 moves clockwise, contact 7 will finally engage contact 11 and close an external circuit, which is described hereinafter. By moving the arm 9 to any desired place along the scale, this external circuit may be closed at any desired salinity concentration.

Contacts 7 and 11 and their corresponding outside terminals 8 and 12 are schematically shown also in Fig. 1 within the square frame of the instrument 1.

Having thus described the instrument used to measure salinity and the warning contacts arranged on the pointer and adjustable arm of the instrument, the circuit of which this instrument is a major part will now be described. 15 and 16 are terminal strips attached to a switchboard-like panel on which the instrument and associated apparatus are mounted. The salinity cells 17 to 21 and 22 to 26 are shown above the terminal strips in a schematic way and it is understood that each of these cells is separately mounted in some of the most important feed water lines connected to the respective boilers on the ship. Each of the first group of these cells, 17 to 21, has one of its electrodes connected to contacts 27 to 31 of a rotary switch 50. Each of the second group of salinity cells, 22 to 26, has one of its electrodes connected to contacts 32 to 36. The remaining free electrodes of cells 17 to 26 are all connected in common on appropriate terminals of terminal strips 15 and 16. The switch has a shaft 51 to which a hand wheel or other operating knob is connected in such a way as to allow the operator to turn the switch. Connected to this shaft, but insulated from it, is a metallic sector 52. A contact arm or brush arm 53 is mechanically and electrically connected to the same shaft, so that both the sector and the arm move in synchronism when the shaft turns. An electric connection by means of a sliding spring or similar device is made between a contact 44 and the shaft 51, connecting the brush arm 53 permanently to this contact. Each of the switch contacts 27 to 31 and contact 44 has a phosphor-bronze or similar spring brush attached to its stud so that the sector 52 can make sliding contact with these springs if turned into a suitable position. In the position shown in the drawing, the sector 52 is making contact with the spring attached to contacts 27 and 44, thereby establishing electrical contact between the contact 27 and the contact 44, contact 39 being dead.

The alternating current for the circuit is derived from a transformer 45, the primary 46 of which is connected to the ship's supply by means of a switch 47 which, when closed, connects the winding 46 to the lines 13 and 14 through two fuses 48 and 48'. The field coil 2 of the meter 1 is at all times in circuit with the secondary 49 of this transformer by means of leads 55 and 56 leading to terminals 57 and 58.

Also continuously excited is the holding coil 3 which is connected to terminals 59 and 60, which terminals are internally connected to the terminals 57 and 58. The field coil 2 produces an alternating field in which the movable holding coil 3 is located, and the field generated in that coil tends to turn the coil continuously in one direction, thereby constituting the restoring or holding force of the instrument. Acting against this force is the field generated in the deflecting coil 4, which is connected to terminals 59 and 61 and which carries the current passing through the particular salinity cell which may be in the circuit at that time.

The principal connections of the different parts of the instrument are best shown in the simplified wiring diagram of Fig. 3, in which cell 26 is shown as being connected in the circuit. It can be seen that current is admitted to cell 26 by means of the brush arm 53 of switch 50. The return circuit from the cell 26 goes through the lead 62 back to terminal 57 of the field coil 2. In the main wiring diagram of Fig. 1, this connection goes from terminal 61 to contact 44 of the switch 50, from there to the switch shaft 51, brush arm 53, terminal 36 through cell 26, and by means of lead wire 62 to terminals 60 and 57 of the field coil 2, and the return lead which completes the circuit goes from terminal 59 to terminal 58 and through wire 56 to the secondary 49 of transformer 45.

Returning now to Fig. 3, we have established a current through the deflecting coil 4 which tends to turn the closed coil employed in a direction opposite to the direction it would turn if coil 3 only were energized. The two opposing torques balance at a given point and thereby place the pointer 5 of the instrument in such a position on the scale that the calibration gives the saline content for the cell 26.

The simplified schematic also shows two resistors 63 and 64 which may be inserted alternatively in the circuit instead of the cell 26 by moving switch 50. If switch 50 is moved to terminal 37, resistor 63 is in the circuit with the deflecting coil, and this resistor is so chosen that for a given temperature its resistance is equal to that of a cell immersed in water which has a salinity of one grain per gallon, for instance. In that case, the pointer of the instrument should go to 1 on the scale 6, thereby affording an easy way of checking the readings of the instrument.

If switch 50 is moved to contact 38, the resistor 64 replaces the cell 26. This resistor is made of a value sufficient to drive the pointer of the instrument clear across the whole scale, so that no matter where the warning contact arm 9 is located, the pointer will cause contact 7 to engage contact 11, thereby closing the warning circuit. Therefore, by moving switch 50 to contact 38, it is possible at any time to check the operation of the alarm circuit, no matter where arm 9 may be located.

Fig. 3 also shows in a schematic way the connection of the temperature compensating resistances 65 and 66. 66 is a so-called terminal resistance which remains in the circuit even if the adjustable rheostat 65 is reduced to zero. Resistors 65 and 66 are connected across the deflecting coil 4, so as to allow more or less current to be bypassed around said coil. This is necessary because the resistance of a salinity cell of a given salt content depends greatly on the temperature of the water, and unless temperature compensation is provided for, the apparent salinity of the cell will increase with increase in temperature. As shown in Fig. 1, the resistor 65 is sub-divided into a number of sections, each of which is connected to contacts 67, which may be engaged by the brush arm 68. The resistors between each of the contacts are of such value that calibration of the whole rheostat in differences of temperature is possible. After measuring the temperature of the boiler feed water in which the particular cell is inserted, the brush arm 68 is moved to a point on a calibrated scale associated with the rheostat corresponding to the measured temperature. In this way the change of cell resistance due to temperature is substantially compensated for, so that the readings of the indicator meter remain correct.

The operation of switch 50 is as follows: The sector 52, being insulated from the shaft 51, serves as a bridge adapted to connect the flexible springs attached to contacts 27 to 31 and to contact 44. If turned to a suitable position, the sector 52 may bridge two, three, four or all five of the cells 17 to 21 and connect them to contact 44 and, thereby, to the deflecting coil. In that case up to five cells in parallel may be connected to the deflecting coil, so that if any one of the cells becomes contaminated, the pointer of the instrument 1 will engage the warning contact, which may be set as desired. The warning circuit, as described before, is energized by means of the contacts 7 and 11 which, when closed, actuate a relay coil 69 which may be fed from the main line current supply or from any other suitable sources. The relay coil will attract its armature 70 and thereby bridge contacts 71 and 72 so that the warning bell 73 and the warning lamp 74 become energized in parallel from part of the secondary winding 49 of transformer 45, as shown.

Switch 50 also may be employed to connect each one of the cells 17 to 21 singly into the measuring circuit by means of switch arm 53. When arm 53 engages any of the contacts 27 to 31, sector 52 is out of engagement with the brush connected to contact 44. The sector is also out of engagement with the spring connecting with the particular contact of the group which the arm engages. The same switch also permits one to measure salinity singly in the second group of cells 22 to 26, which are connected to terminals 32 to 36 on the switch. It therefore is quite evident that the novel combination of elements in this switch allows a multitude of measuring operations to be carried out with a minimum of parts, as it is possible to measure up to five cells in parallel, or each one of the cells of that group separately, and also provides two checking positions, one of which checks the correctness of the scale readings and the second one checking operation of the alarm circuit, as described hereinbefore. This combination makes operation of the salinity indicator system extremely simple, and at the same time allows the operating personnel to relax their vigilance by the simple expedient of connecting the most vital cells permanently in parallel into the circuit in such a way that the contamination of any one of five cells will actuate the alarm circuit, thereby calling attention to the danger.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

In a salinity alarm system, an alarm, a plurality of testing cells suitable for immersion in a saline solution and variable as to resistance with the salinity of the solution, and a testing circuit connected to said cells including a switch for selecting a group of cells or any individual cell for test purposes, a source of suitable testing potential and a combined indicating and contact making meter actuated in accordance with the resistance of said cell or cells, said meter having a scale graduated in degrees of salinity, a movable pointer readable on said scale, and contact means settable along said scale for actuating said alarm upon deflection of said pointer to the set position, whereby said alarm is caused to operate at a predetermined degree of salinity of a single cell or a selected group of cells.

RAYMOND L. WITHAM.